Oct. 24, 1961  A. G. THOMAS  3,005,374
NON-GLARE HEADLIGHT SYSTEM
Filed Jan. 21, 1958  3 Sheets-Sheet 1

Albert G. Thomas  INVENTOR.

Oct. 24, 1961     A. G. THOMAS     3,005,374
NON-GLARE HEADLIGHT SYSTEM
Filed Jan. 21, 1958     3 Sheets-Sheet 2

Albert G. Thomas    INVENTOR.

Oct. 24, 1961 A. G. THOMAS 3,005,374
NON-GLARE HEADLIGHT SYSTEM
Filed Jan. 21, 1958 3 Sheets-Sheet 3
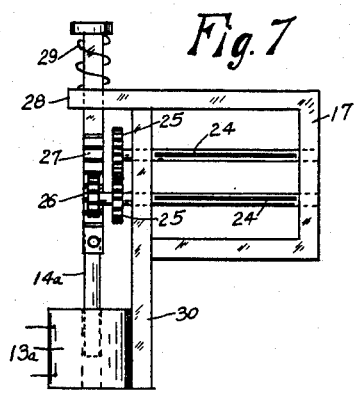
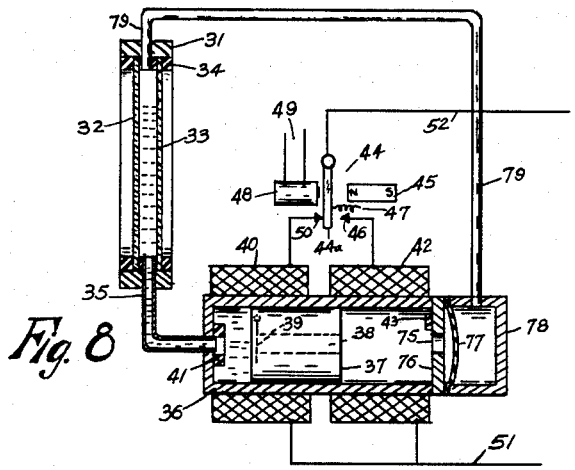
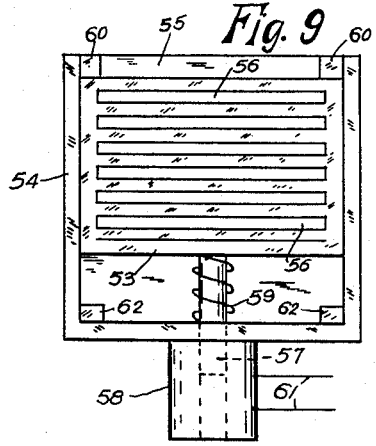
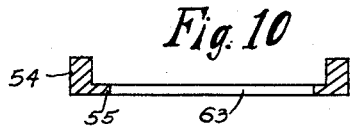
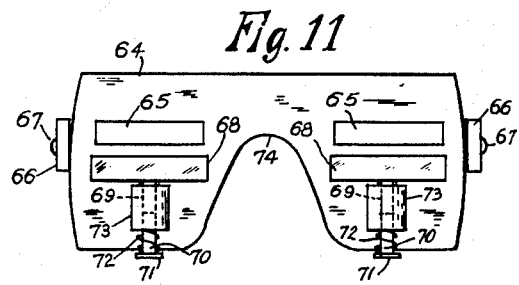
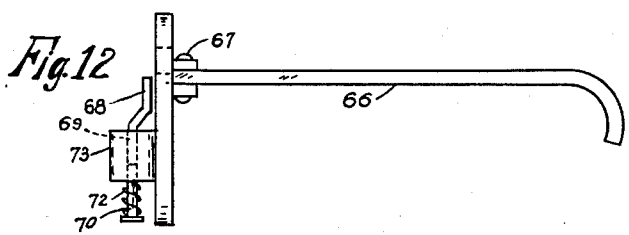
Albert G. Thomas    INVENTOR.

United States Patent Office 3,005,374
Patented Oct. 24, 1961

3,005,374
NON-GLARE HEADLIGHT SYSTEM
Albert G. Thomas, Butler, Pa.
(133 Bollingwood Road, Charlottesville, Va.)
Filed Jan. 21, 1958, Ser. No. 710,305
3 Claims. (Cl. 88—1)

The invention relates to headlight systems for motor cars and other vehicles, and to other devices.

The problem of headlight glare from motor vehicles has long been recognized and many unsuccessful attempts have been made to overcome the blinding glare from approaching vehicles. Little practical success has been achieved however.

It is an object of this invention to provide a glareless motor vehicle headlight system.

A further object is to provide a non-glare headlight system which will illuminate a street, road, or highway very brightly without any appreciable glare in the eyes of an on-coming driver of another vehicle.

Another object is to provide a glare-less lighting system for use with motor vehicles such as automobiles, trucks, busses, aircraft, and at airports and the like.

Additional objects will be evident in the following description.

In the drawings:

FIGURE 1 is a top plan view of non-glare headlight systems for two approaching vehicles which may be motor vehicles such as automobiles, trucks, busses, boats, or the like.

FIGURE 7 is a front elevation of a shutter type viewing device for a motor vehicle driver.

FIGURE 8 is a part sectional side elevation of a fluid type window or viewing device the opacity of which can be controlled.

FIGURE 9 is a front elevation of a slotted viewing device having relatively movable slotted plates.

FIGURE 10 is a cross sectional end view of the guide unit of the device of FIGURE 9.

FIGURE 11 is a front elevation of a controllable viewing device to be worn by the driver of a vehicle.

FIGURE 12 is a side elevation of the device shown in FIGURE 11.

The broad principle of this non-glare headlight system is to equip vehicles with means for automatically reducing or extinguishing illumination from one relatively approaching vehicle while the driver of the other vehicle has clear vision of the road, then blocking vision of the other driver while road illumination from the first vehicle is re-established. Illumination of the road is established alternately by the lighting systems of two vehicles and the road view of each driver is temporarily blocked while illumination of the road by his headlight system is ineffective. The view of the road is clear for each driver while his headlight system is illuminating the road. If the frequency of interruption of illumination by each headlight system is from 16 to 24 or more per second then, due to the persistence of vision, each driver will see the road and the other vehicle clearly and without flicker.

This system makes it possible to illuminate the road as brightly as desired, without glare.

Figure 1:
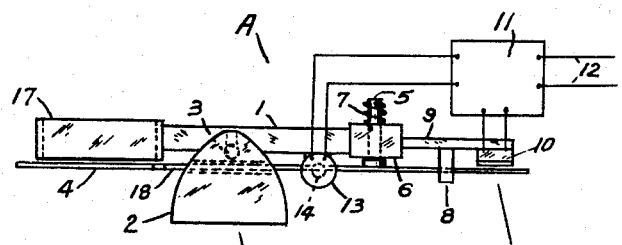

In FIGURE 1, the bar 1 is attached to a motor vehicle, not shown, or is a part of that vehicle. Headlight or headlamp 2 comprises a reflector attached to bar 1, and electric lamp 3 in a suitable socket which is electrically connected to a battery or other source of current. The bottom portion of reflector 2 is slotted to receive upwardly moved thin shutter 4 which is attached to stub shaft 5 which is rotatable in a bearing in post 6 integral with bar 1. Torsion spring 7 is attached to shaft 5 and to post 6 and normally yieldingly holds the shutter up against stop 8 attached to arm 9 extending from post 6. Stop 8 may be of resilient material like rubber, a spring, or the like.

Photocell or other radiation-sensitive device 10 is attached to arm 9, with its sensitive face adjacent the shutter. This photocell may be of any suitable type like the well known multiplier phototubes, or it may be a self-generating selenium photocell, or a cadmium sulphide or other type. The photocell is connected to the input of amplifier 11 which is supplied with current by means of conductors 12 leading to a source of current such as a battery or generator. This amplifier may contain electronic tubes or transistors and other components. The output of the amplifier is connected to the terminals of solenoid 13 which is fastened to bar 1 and has plunger or armature 14 suitably pivoted to shutter 4 in similar manner as the attachment of plunger 14 of FIGURE 2 to arm 20 by means of pivoted link 16. The amplifier may have thyratrons in the output stage, to provide snap action.

Viewing frame 17 is fastened to bar 1 and may be arranged at any suitable level or in any desired location. This frame should be positioned in front of the driver so that he can look through it. The frame may have an attached hood if desired. This hood may be flared or of any suitable shape for confining vision to a limited area. The shutter may have a rising portion similar to shutter 18 of FIGURE 2.

It is preferable that shutter 4 should normally be below frame 17, with lamp bulb 3 and frame 17 uncovered. This is to prevent blocking of the headlamp and the driver's vision in case something should go wrong with the mechanism. The portion 23 of the shutter on the opposite side of pivot 5 normally is above photocell 10, not covering this photocell.

The construction of the headlight system B of the approaching vehicle is identical with the previously described system which is indicated by the letter A. Similar parts are indicated by similar numerals.

In operation, suppose that the cars or other vehicles are approaching and that uncovered photocell 10 of car A first receives sufficient light from lamp 2B of car B to energize amplifier 11 sufficiently to cause actuation of solenoid 13 to pull shutter 4 quickly through a clockwise angle, thereby causing the shutter 4 to cover viewing frame 17 and to cover photocell 10 of car A. When the photocell is covered, the solenoid is deenergized and spring 7 swings the shutter counter clockwise about the pivot until viewing frame 17 is again uncovered and the photocell 10 is again uncovered. Therefore the shutter will be oscillated at predetermined rate. The tension of spring 7, the inertia of the system, the strength of the solenoid and other factors are so chosen that the natural frequency of vibration of the shutter, under steady illumination from lamp 2B, will be, say, 24 times per second. Resilient bumpers or stops similar to stop 8 may be provided for both directions of travel of the shutter.

The driver of car A is viewing the road through frame 17 and his view of the road is periodically blocked by the oscillating shutter but, due to the persistence of vision, he sees the road clearly. For the same reason the fluctuation of light is not especially noticeable to the driver of car B. As the shutter 4 is pulled up over frame 17 it also enters the slot of reflector 2 and largely covers the lamp bulb 3 of car A so that little if any light will be directed on the road from that lamp. Therefore it will be seen that when the view of the driver of car A is blocked his headlight is effectively also covered, and vice versa.

As the two vehicles approach each other photocell 10B will finally be illuminated sufficiently by the fluctuating light from headlight 2 to cause amplifier 11B to energize solenoid 13B to pull shutter 4B quickly up and over the viewing area of viewing frame 17B and up through the slot in the casing of headlight 2B, blocking light from this lamp. Thus the view of the driver of car B is temporarily blocked while illumination from his headlight is blocked; also, photocell 10B is covered by shutter 4B while the frame 17B and headlight 2B are blocked. When this happens light from lamp 2B does not strike photocell 10 and so shutter 10 is returned to starting position as previously described, by means of spring 7. This results in headlight 2 directing light against photocell 10B which, if not already uncovered, will soon be exposed as spring 7B returns shutter 4B to starting or normal position with the photocell 10B, lamp bulb 3B, and viewing frame 17B all uncovered. Similarly, if photocell 10 is not already uncovered it soon will be as spring 7 returns the shutter to starting position and so light from headlight 2B will again strike photocell 10 causing shutter 4 to cover the viewing frame 17, the lamp bulb 3, and photocell 10.

It will be seen that the two headlight systems are mutually synchronized in operation so that when either headlamp directs light upon the road and to the approaching photocell, the oncoming headlamp is blocked as well as the effective vision of the driver of the oncoming vehicle. Therefore the road is illuminated alternately by the headlights of the two cars and there is no glare. It is preferable to design the system or systems so that the natural period of vibration or oscillation is the same for both.

The vertical dimension of the opening in the viewing frames and the vertical dimensions of the shutters and photocells, together with the solenoid design and strength of the springs can be so chosen that the components will be covered or uncovered very quickly and will remain covered or uncovered for the desired time interval or intervals. The design should be such that the viewing frame and headlight of either car is effectively covered or blocked by the shutter while the headlight of the opposite or oncoming car is projecting any appreciable degree or intensity of light.

While the physical blocking of light from the headlight is described it should be understood that the lamp may be energized and deenergized in order to produce light or to diminish the illumination. Ordinary filament type lamps are difficult to control in this way with sufficient rapidity but some gaseous lamps or other types such as arcs or the like may rapidly be made effective or ineffective. In that case the photocell can be made to control the energization of the lamp and perhaps also the effective opacity of the viewing window.

Figure 2:
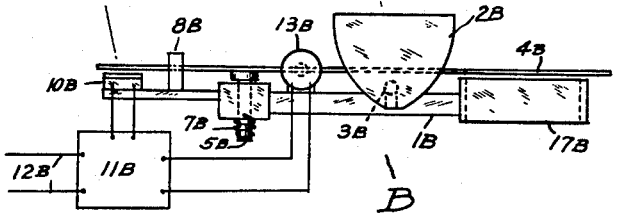
FIGURE 2 is a front elevation of one of the approaching units of the system or systems shown in FIGURE 1, with modified details.
Figure 2:
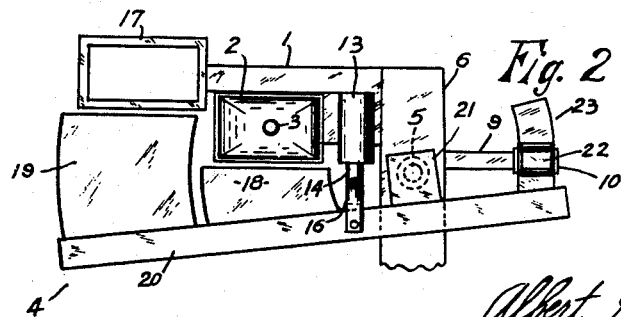

In FIGURE 2 the construction is similar to that shown in FIGURE 1. The shutter elements 18 and 19 of shutter 4 may be curved as shown and may be of such dimensions that the desired timing effects will be achieved, as previously described. The bar 20 of shutter 4 has lug 21 to which stub shaft 5 is attached. Window 22 in shutter element 23 attached to bar 20 normally exposes the sensitive surface of photocell 10 but when solenoid 13 is energized the element 23 is rotated clockwise about pivot 5 so that the upper portion of element 23 covers the photocell, preventing light from reaching it. The shutter elements 18 and 19 may rise in front of the respective headlight 2 and viewing window 17, if desired.

The construction of the shutter arrangement can be made very light and if it is desired to have the viewing window 17 separated from the headlamp structure a separate solenoid connected with solenoid 13 may be used as shown in FIGURE 7. In this figure, viewing frame 17 has shutters 24 rotatably supported and meshed gears 25 may be rotated to turn the shutters to the open position shown or to overlap and so to block vision of the driver who looks through the frame. Gear 26 is attached to the shaft carrying one gear 25 and associated shutter and is meshed with rack 27 attached to the plunger 14a of solenoid 13a. The rack is vertically movable in a bearing in extension 28 from the frame and spring 29 is compressed when the solenoid is energized. The solenoid is attached to extension 30 from the frame 17. Therefore, when the solenoid is energized the plunger and rack are pulled down, compressing spring 29 and rotating shutters 24 to overlap and so to block the driver's view of the road. The frame can be placed in such a position that the driver can look over it or to one side in case the operation becomes faulty. Any desired number of vanes or shutters can be used to provide fast action and these shutters may be made of rubber or plastic material if desired, in order to reduce noise and wear and tear. It is obvious that rotary disc type or similar elements may be used to cover and uncover closely spaced viewing slots in a plate. The solenoid 13a would be connected in circuit with solenoid 13. Separate electrically connected solenoids can be used for actuating shutters for the viewing window, the headlight, and the photocell.

While one headlight is shown for each vehicle it should be understood that two or more headlights may be used for each car and the respective shutters may be mechanically linked to operate in unison, or solenoids or other electrical means may be used and simultaneously energized and deenergized to produce the desired shutter action. The photocells are placed in suitable positions on the cars to receive light from headlights of approaching cars and suitable shields may be provided to eliminate or reduce reception of light from street lights, signs and the like. A further method of avoiding this type of interference would be to use light filters over the photocells and to use effective wavelengths not ordinarily found in street lights or signs.

A special or extra headlight or radiation source projecting infra-red or ultra violet radiation or radio waves can be placed on each car and the photocells or other radiation-sensitive means can be arranged to be sensitive only to the selected wavelengths produced by these sources. This invisible light may be periodically covered by a shutter as described, or it may be continuous to provide actuating illumination for an oncoming car with a similar headlight system. In the latter case the two systems would have to be synchronized for opposite phasing as described in the operation of the system. Many alterations of the details of construction are possible. For instance, rotary cylinders with windows may be used as shutters surrounding the lamp bulbs and lens systems may be employed in conjunction with very narrow lamp or viewing window openings in order to reduce the necessary degree of movement of the shutters and at the same time to provide adequate viewing of the road or highway, and adequate illumination. It may be desirable to provide solenoids for moving the shutter in both directions rather than to use a spring for one direction. A fast-acting double throw relay can be used for energizing the solenoids, the normal position of the relay causing energization of the solenoid which moves the shutter or shutters to normal position not blocking the light or the driver's view.

A variety of devices or arrangements may be employed for periodically blocking the driver's view or for causing intermittent illumination of the road. In FIGURE 8, frame 31 holds two closely spaced glass or plastic transparent panes 32 and 33 which are sealed in the frame by rubber or other suitable material 34. Pipe 35 is also sealed in the frame and leads into the space between the panes, the other end of the pipe being connected with the interior of cylinder 36 in which piston 37 is slidable. This piston may have sealing rings, if desired, and should be at least partially constructed of iron or steel. If desired, the piston may be provided with central channel 38 and flap valve 39 to prevent build-up of fluid behind the piston; or, the piston may be loosely fitted.

Annular magentizing winding 40 is fastened around the forward end of the cylinder and serves, when energized, to attract the pitson to the left against rubber bumper 41. Similar winding 42 is fastened around the rear portion of the cylinder and pulls the piston back against bumper 43 when this winding is energized. Relay 44 has armature 44a normally biased by permanent magnet 45 to be touching relay contact 46 but a spring 47 may be used in place of magnet 45, or both may be employed. Relay coil 48 can be supplied current through conductors 49 to pull armature 45 quickly over against relay contact 50 connected with one end of winding 40, the other end of which is connected with line 51. One end of winding 42 is also connected to line 51 and the other end of this winding is connected with contact 46 as indicated. One line 52 is connected to the armature 44a.

Cylinder 36 should be made of non-magnetic material such as brass, plastic, some types of stainless steel, or the equivalent. It would be preferable for the cylinder to be non-metallic to avoid generation of eddy currents. A suitable dark liquid or gas is introduced into the forward portion of the cylinder through a hole which can be sealed. If liquid is used it is preferable that it shall have low viscosity. Air or other gases containing suspended carbon particles can be used or naturally dark gases or vapors can be employed. A suitable liquid would be alcohol containing a dark dye, or some of the light petroleum fractions would be suitable.

In operation, relay winding 48 may be connected with a photocell-controlled amplifier similar to amplifier 11 of FIGURE 1 so that this winding will be periodically energized at proper times, as previously described, and armature 45 will accordingly be pulled over against contact 50. When this happens coil 40 is energized and piston 36 is quickly pulled to the left, forcing the dark fluid up between plates or panes 32 and 33 to block the driver's view of the road. When coil 48 is deenergized the magnet 45 or spring 47 will quickly pull the armature back against contact 46 to cause energization of winding 42. When this happens piston 37 is quickly pulled back against synthetic rubber or other bumper 43 so that most of the dark fluid is drawn from the space between panes 32 and 33, resulting in clear vision of the road for the driver of the vehicle. The panes may comprise the windshield of the car or they may be separate and positioned in front of the driver. The frequency of filling and emptying the space between the panes should be 16 or more times per second and, as previously indicated, the view should be blocked for the full intervals during which the lights of the approaching car or cars are illuminating the road. This type of darkening or light blocking device may also be used for chopping the light from the headlights. A spring may be used for pushing piston 36 to the right, if desired. An electronic relay may be used for relay 44.

FIGURE 9 shows another type of light modulating or control device for periodically blocking the view of the motor vehicle driver or for chopping the light beam of a headlamp. Slide 53 is reciprocable in guide frame 54, which, as shown in FIGURE 10, is integral with thin plate 55 which has a plurality of parallel slots spaced similarly as slots 56 in slide 53 which preferably is also of relatively thin metal, plastic, or other suitable material. Plunger or armature 57 of solenoid 58 is attached to slide 53 and the solenoid is fastened to frame 54 as indicated. The plunger is movable in the solenoid through a hole in frame 56 and has attached compression spring 59, the other end of which presses against frame 54 normally to keep the slide yieldingly pressed against rubber or other bumpers 60 which are attached to upper portions of plate 55.

The slots and the material between them are preferably rather narrow so that a good view of the road can be obtained when the slots are in register. The spring normally keeps the slots in register, the slide being held against the bumpers. When, however, the solenoid is energized by passing current through conductors 61, the plunger is quickly pulled into the solenoid and slide 53 is pulled down against rubber or other bumpers 62 attached to frame 54. In this position, solid portions of the slide stop light from passing through the slots 63 of plate 55 and the driver's view of the road is blocked. Therefore, if the solenoid is energized intermittently at a rate of 16 or more times per second, the driver's view of the road is blocked when the intermittent light from the approaching car is illuminating the road. This solenoid may be connected with the amplifier 11 of FIGURE 1 so that it is energized when photocell 10 is energized.

If the slots are narrow and closely spaced, only a slight movement of the solenoid plunger will be necessary. The oscillatory movement of the slotted slide can be produced by an arm pivoted to a member rotated by a synchronous motor or other means. In this case bumpers are not necessary. While slotted plates are described, clear glass or plastic plates having opaque parallel strips could be used. It is not essential that the slots or strips be parallel but other designs can be used. Likewise, rotary rather than slidable light modulating plates can be employed. This light control device may be used for chopping the light of headlights also if desired. Again the various components should be designed and timed so that the view of one driver is obscured when the headlights of the other are illuminating the road, and vice versa.

In FIGURES 11 and 12 facial mask 64 has eye slots or windows 65. Mask 64 may be made of metal, plastic, or other material and is preferably opaque, although it could be translucent if desired, but sufficiently light-absorbing to prevent glare from headlights. Members 66 are hinged to the mask at 67 and are adapted to be fitted over the ears like eye glasses. A head band, attached cap, or other means could be used to support the slotted mask however. Rectangular shields 68 are made of opaque metal, plastic, or other material and are attached to brass or other non-magnetic rods 69 which are fastened to iron or steel solenoid plungers 70 by threading, welding or the like. These plungers have end flanges 71 against which compression springs 72 press, the other ends of these springs pressing against the lower ends of solenoids 73 which are attached to the mask.

The springs normally hold shields 68 below the eye slots 65 but when the solenoids are energized by passing current through the windings thereof, the plungers 70 are quickly pulled up into the solenoids with the result that screens or shields 68 are lifted to positions to cover slots 65. Under these conditions the wearer of the mask cannot see the road. When the solenoids are deenergized the springs quickly cause the shields to be brought down to the positions shown, allowing visibility of the road again. The rate of energizing the solenoids will be the same as described before. The windings of these solenoids are electrically connected so that they will be energized simultaneously, or one solenoid or magnet may be used and the shields 68 can be mechanically connected. These solenoids may be connected in circuit with solenoid 13 of FIGURE 1. In this case the part of the shutter 4 adjacent frame 17 may be eliminated along with this frame. The shutters or shields 68 substitute for shutter 11 adjacent the viewing frame.

A good view of the road may be obtained with rather narrow slots 65 and therefore extensive movement of shields 68 is not necessary. If desired, slots 65 could be merged into one long slot and the shields may be mounted to turn about a pivot if rotary movement is preferred. Likewise, the periodic covering of the slots can be effected by rotated shutters driven by a synchronous motor. The nose piece 74 may be padded if desired. This type of intermittent shield has the advantage that the driver's head may be moved more freely as compared to conditions with the shutter means mounted on the windshield. The driver can also have a wider angle of view with the head-supported shutter means.

Figure 3:
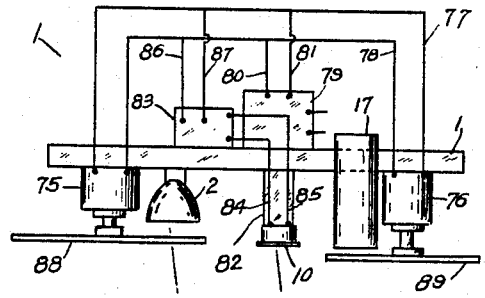
FIGURE 3 is a top plan view of a non-glare headlight system for two approaching vehicles, employing rotary shutters instead of vibrated shutters as in FIGURE 1.

In FIGURE 3, like parts are given like numerals as in FIGURE 1. In this case rotary shutters or light choppers are used. Synchronous motors 75 and 76 are attached to bar 1 carried by one vehicle and synchronous motors 76B and 75B are attached to bar 1B carried by the approaching vehicle. Motors 75 and 76 are connected in parallel by conductors 77 and 78 which are connected to oscillator-amplifier 79 by means of conductors 80 and 81. Oscillator 79 may be connected to the battery of the vehicle or to another source of current. Photocell 10 is mounted on bar 82 extending from bar 1 and is electrically connected with amplifier 83 by means of conductors 84 and 85. Oscillator 79 is either combined with an amplifier or else has sufficient power to drive synchronous motors 75 and 76 at predetermined speed. Amplifier 83 is designed to have more output power than oscillator 79 so that the motors will follow this amplifier rather than oscillator 79 if both are feeding intermittent current pulses to conductors 77 and 78. Amplifier 83 is connected to a suitable source of current and is connected to conductors 77 and 78 by means of conductors 86 and 87.

Disc 88 is fastened to the shaft of motor 75 concentrically therewith and disc 89 is similarly fastened to the shaft of motor 76. These discs have a plurality of apertures or windows like windows 90 of FIGURE 6, equally spaced and at equal radial distances, considering one disc. The apertures of disc 88 are arranged to be rotated into register with headlight 2 and the apertures of disc 89 are arranged to be rotated into register with viewing frame or tube 17 which is fastened to bar 1. When the apertures are not in register as described, the headlight or viewing tube will be covered by solid, opaque material of the discs. The holes or apertures of these discs may be fewer and spaced further apart than indicated in FIGURE 6, in order to provide sufficient solid material and sufficient blocking time intervals.

Motors 75 and 76 may be identical, preferably having the same number of poles. The discs, similarly, preferably have the same number of apertures. These discs are fastened to the motor shafts with such relative phasing that the apertures of disc 88 are in register with headlight 2 when the apertures of disc 89 are in register with viewing tube 17, assuming synchronous rotation of the motors. Furthermore, the arrangement is such that when photocell 10 is illuminated by light from approaching headlight 2B the field windings of motor 75 are energized and disc 88 is quickly rotated to a position in which light from lamp 2 is blocked and so does not illuminate the road. At the same time, disc 89 will be quickly rotated to a position so that a solid portion of this disc will block the view of the driver who looks into tube 17.

Figure 4:
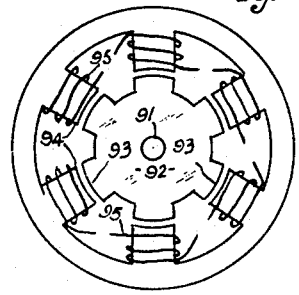
FIGURE 4 is an end view with end bell removed, of a synchronous type motor suitable for use in the system of FIGURE 3.

The motors may be constructed as indicated diagrammatically in FIGURE 4. The motor shaft 91 carries attached rotor 92 which has a plurality of equally spaced poles 93 which are adapted to be rotated into register with field poles 94 as shown. The field poles are surrounded by windings 95 which may be connected to conductors 77 and 78 of FIGURE 1. If the field windings are energized periodically by alternating or pulsed direct current the rotor will revolve in synchronism with the pulsations as in known synchronous motors. The synchronous motor may be made self starting in known manner.

These motors may be step motors as described in my U.S. Patent No. 2,774,922. Assuming that the rotor and stator shown in FIGURE 4 are one phase of a two or three phase step motor, the discs will be placed on the shafts so that, for example, the apertures in the discs will be in register with the respective headlight and viewing tube when the rotor poles of one phase are in register with the stator poles of that phase, as illustrated. When the motors take the next step the apertures are out of register and solid portions of the discs cover the headlight and viewing tube. The third step again moves the discs to in-register position. It is apparent therefore that alternate steps cause the headlight and viewing tube to be covered and uncovered. In that case the number of steps per revolution of each motor should preferably be twice the number of apertures in each disc, unless a stepped up or stepped down drive is used between the motor shafts and the discs. In order to be sure that the motor will always be in the same starting position, for proper phasing, one phase can have more residual magnetism than the others or added permanent magnets can be used in the rotor and stator of this phase for aligning purposes. The construction of the approaching headlight system is the same as that described, similar parts being given similar numerals with sub letters "B."

In operation, the motors of both headlight systems are kept rotating at all times by timed pulses of current from oscillators 79 and 79B; or ordinary sinusoidal alternating current may be provided by the oscillators which are tuned to virtually the same frequency. Since the light from headlights 2 and 2B and the views of both drivers are chopped at 16 or more times per second, the road will seem to be steadily illuminated. Very bright lamp bulbs may be used for both headlights. When light from headlight 2B, say, strikes photocell 10, the stronger amplifier 83 takes over and overpowers the relatively weak energizing pulses from oscillator 79. Therefore, in effect, the motors 75 and 76 are driven in synchronism by the intermittent electrical energy from amplifier 83, which energy may be sinusoidally varied if desired. If the phasing is such that light from headlight 2 is blocked when headlight 2B is effective, and vice versa, then the two systems will be alternately effective to produce light on the road, the view of the driver of the car carrying bar 1 being blocked by apertured disc 89 while the light from headlight 2 is blocked. During these periods the view of the driver of the car carrying bar 2B will be unobstructed and he will see the road clearly. Similarly, when the light from headlight 2 strikes photocell 10B and causes the rotors of motors 76B and 75B to be brought into register with the field poles, as described, the light from headlight 2B will be blocked and the view of the driver of this approaching car will be obstructed, the frequency of this blocking or obstructing being the same for both systems which, therefore, are mutually synchronized.

In the above described system the motors on both cars are normally rotated by intermittent energy from the respective oscillators 79 and 79B until the photocells are illuminated sufficiently by light from the opposite or approaching cars. Then the systems are mutually timed or synchronized by energy from stronger amplifiers 83 and 83B. If desired, electronic or other relays operated by current or potential from the photocells can be arranged to cut the oscillators effectively out of circuit while the photocells are receiving light from opposite-moving cars. The photocells should be sensitive enough to control the systems before the light from the headlights produce glare for the drivers. The discs 88 and 89 may be driven by chains, gears, shafts, or other mechanism rotated by one motor.

In the systems described in FIGURES 1 and 3, since the speed of light is so great as compared to the speeds of the cars and associated mechanism, the headlights of a line of motor vehicles will be virtually simultaneously controlled, for both directions of travel, assuming that all cars are equipped with similar intermittently illuminating and view-blocking systems. The photocells may be placed in opaque open tubes or may otherwise be shielded from light from street lamps and advertising signs. The photocells may be made ineffective while driving through cities by opening switches, if this is desired.

Figure 5:
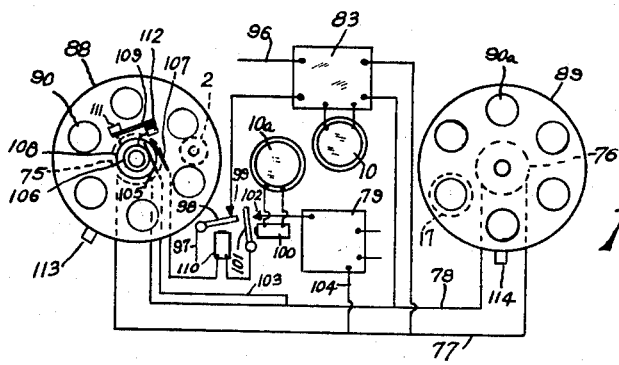
FIGURE 5 is a front elevation of a modification of the headlight system of FIGURE 3.

FIGURE 5 illustrates an intermittent headlight system in which the motors are normally not rotating but are energized when the light from the headlights of an approaching vehicle strikes a photocell. Apertured discs 88 and 89 are driven by synchronous or step motors 75 and 76, as in FIGURE 3. Photocell 10 is connected with amplifier 83 which is supplied current through lines 96 and 97. The latter is connected to relay armature 98 normally touching contact 99 which is connected to amplifier 83. This may be a transistor amplifier or any suitable type. The relay is shown connected into the primary lines but it may be in the output or in any part of the circuit which will control the effectiveness of the amplifier. The conductors 77 and 78 connect synchronous motors 75 and 76 which may rotate discs 88 and 89. Photocell 10a is connected to relay winding 100 which is adapted to attract normally open relay armature 101 when winding 100 is energized. When this happens, armature 101 is attracted to make contact with relay contact 102 connected with the output of oscillator or generator 79 which may supply pulsed direct current, or alternating current, to lines 77 and 78 through conductors 103 and 104. Conductor 103 leads to brush 105 in contact with slip ring 106 and brush 107 is touching slip ring 108. These slip rings are mounted on the shaft of motor 75 but are insulated one from the other. Brush 107 is connected to one terminal of relay winding 110 associated with normally closed relay armature 98 and the other terminal of this winding is connected to relay armature 101.

Viewing tube 17 is placed behind disc 89 and is periodically uncovered by apertures 90a so that the road may be seen intermittently when this disc is rotated. Likewise, headlight 2 is periodically uncovered as the apertures 90 are rotated past. It is preferable that photocell 10a be somewhat more sensitive than photocell 10 in order to start the motors rotating when the lights from an approaching car are relatively dim. An amplifier may be connected between this photocell and coil 100.

Spring strip 109 is fastened to block 111 which is attached to disc 88. This strip is electrically connected to slip ring 108 and carries an electrical contact at its free end. This contact is normally pressed against contact 112 fastened to disc 88 and electrically connected to slip ring 106. These parts are suitably insulated. Weight 113 on disc 88 normally holds this disc in position so that an aperture 90 is in register with headlight 2, and weight 114 on disc 89 normally holds this disc in a position causing an aperture 90a to be in register with viewing tube 17. Fewer apertures than shown can be used in order to provide a greater length of time for the blocking intervals. Furthermore, the apertures may be elongated in order to provide longer time intervals for viewing.

In operation, assume that an approaching vehicle is equipped with a generally similar headlight system. The light from the headlights of both vehicles will be steady. Now when the intensity of the light striking photocell 10a reaches a predetermined value, relay winding 100 will be energized sufficiently to attract armature 101 against contact 102 so that oscillator 79 is effectively connected into circuit with conductors 77 and 78 and therefore both motors 75 and 76 start revolving in synchronism. At the same time relay winding 110 will be energized and armature 98 will be pulled away from contact 99 thereby removing amplifier 83 effectively from the circuit. The relay armature 98 could be in the circuit of photocell 10 if desired. The motors are quickly brought up to speed, providing a blocking frequency of about 16 to 24 times per second. When this happens centrifugal force causes spring 109 to fly out and to separate its contact from contact 112. This deenergizes relay winding 110 and allows armature 98 to be pulled by its spring into contact with element 99, connecting amplifier 83 effectively into circuit. The operation then is the same as previously described. When the cars pass and no more light or insufficient light strikes photocell 10a, the armature 101 is pulled away from contact 102 by its spring and oscillator 79 is then out of circuit even though the centrifugal switch closes again as the discs decelerate. These discs are again aligned by their weights as described. They may be aligned magnetically or otherwise in order to avoid the unbalancing effect of the weights.

In the above described system small or relatively dim auxiliary headlights may be kept burning constantly if desired. These headlights could produce infra-red or ultra-violet light if it is desired to reduce the effective illumination. Photocell or heat-sensitive device 10a could then be selected in accordance with the type of light which is arranged to strike it. Suitable shields or filters may be used to prevent excessive reflected road light from affecting the photocell 10a. Likewise, condensers may be connected across the relay windings in order to prevent chatter.

Figure 6:
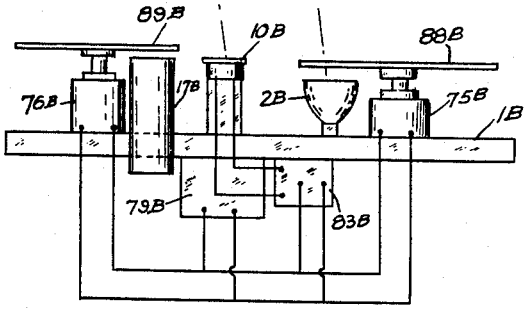
FIGURE 6 shows other modified components of the headlight system shown in FIGURE 3.

One method for preventing low-frequency fluctuation of light, which may occur as the discs slow down, is illustrated in FIGURE 6. The disc 88 having apertures 90 may be driven constantly or started and stopped as described in connection with the device of FIGURE 5. The headlight 2 is mounted on arm 115 which is pivoted at 116 to bar 1. Spring 118 normally holds arm 115 back against stop 119, with headlights 2 not covered by disc 88. Solenoid 120 is attached to bar 1 and has plunger 121 attached to link 122 by pivot pin 123. The link is attached to arm 115 by means of pivot pin 124. Photocell 117 is connected to amplifier 116a the output of which is connected to the winding of solenoid 120. Therefore, normally, headlight 2 provides uninterrupted light for illuminating the road but when another car approaches the photocell 117 is illuminated and solenoid 120 is energized to pull headlight 2 quickly behind rotating apertured disc 88. The headlight may also be moved quickly to the position shown. The disc may of course be shifted instead of the headlight or a movable reflector may be shifted.

In all of the foregoing systems two or more headlights may be used with mechanically or electrically synchronized shutters or apertured discs. Means for covering and uncovering the headlights have been shown but the lamps may be energized and deenergized at the desired frequency by connecting the electric lamps to the photocell-controlled amplifiers or otherwise. Some types of bright mercury or other vapor lamps or arc lamps may be made alternately luminous and dark quite rapidly, as well as some gaseous lamps which may conduct electrical discharges. Fluorescent material like calcium tungstate may be strongly bombarded by electrons or ions in order to produce a bright, rapidly changeable light.

The viewing device may comprise liquid between glass or other transparent panes and the liquid may be agitated at sonic or ultrasonic frequency to produce turbulence when it is desired to reduce the degree of illumination received by the driver from the headlights of an approaching vehicle. The turbulent fluid will refract or scatter light so that blinding rays do not reach the driver's eyes. In similar manner some liquids may change in opacity in proportion to the strength or frequency of electric current conducted by the liquid or in proportion to magnetic or electrostatic fields applied to the liquid by coils or screens adjacent thereto. One method would be to have elongated particles suspended in the liquid or a plastic and to align these particles at the desired frequency by means of varying electrical or magnetic fields, in order to transmit varying degree of illumination.

Numerous changes of detail may be made without departing from the general principles which I have disclosed. For example, heat sensitive devices may be used instead of photocells sensitive to visible radiation; or radio or other electromagnetic means may be employed; or high pitched sound. I mean for the word "light" to include visible and invisible radiation. As shown in FIGURE 8, hole 75 may be provided in end wall 76 of the cylinder and elastic membrane 77 may cover this hole, being sealed by cup 78 attached to wall 76. Pipe 79 leads from cup 78 to the upper space between panes 32 and 33 so that when piston 37 moves to the right it distends membrane 77 and forces air or other fluid through pipe 79 to help force fluid down from between the panes. This accelerates clearing of the window means.

What I claim is:

1. In a motor vehicle headlight system, means for producing illumination and means for effectively blocking the forward view of the driver of said vehicle and for effectively blocking the projection of illumination from said illumination producing means, radiation-sensitive means adapted to receive radiation from a source, said blocking means being adapted also to shield said radiation-sensitive means, and means controlled by said radiation-sensitive means for actuating said blocking means to block effectively said illumination and driver's view and said radiation-sensitive means concurrently, said controlled means including means for restoring said blocking means to a position making said illumination and the view of said driver effective.

2. In a motor vehicle headlight system, a headlight, a member pivoted to reduce illumination from said headlight periodically when said member is oscillated about the pivot thereof, said member having a portion for periodically blocking the visibility of the driver of said vehicle concurrently with said illumination reduction, light sensitive means, means including electromagnetic means electrically connected with said light sensitive means for actuating said pivoted member to cause said periodic reduced illumination and visibility blocking when light from another vehicle is periodically directed against said light sensitive means, said pivoted member also acting to reduce the degree of illumination of said light sensitive means when said visibility is reduced, and means for returning said member to a position increasing the degree of illumination projected by said headlight and the degree of illumination reaching said light sensitive means from said other vehicle.

3. In a motor vehicle headlight system, a headlight carried by said vehicle, reciprocable means for periodically reducing the illumination projected by said headlight and for reducing the visibility of the driver of said vehicle thereby producing a reduced illumination condition, a light sensitive element, means including electromagnetic means for actuating said reciprocable means, electrical means connecting said light sensitive means and said electromagnetic means to cause actuation of said reciprocable means to produce said reduced illumination condition, said reciprocable means also acting to reduce the degree of illumination striking said light sensitive means from an approaching vehicle, and resilient means for restoring said reciprocable means to a position increasing the degree of illumination projected by said headlight and the degree of visibility of said driver and also increasing the degree of illumination striking said light sensitive element from said approaching vehicle.

References Cited in the file of this patent

UNITED STATES PATENTS

| | | |
|---|---|---|
| 1,245,241 | Kendig | Nov. 6, 1917 |
| 1,999,527 | Ronning | Apr. 30, 1935 |
| 2,003,248 | Chilowsky | May 28, 1935 |
| 2,066,680 | Gieshieng et al. | Jan. 5, 1937 |
| 2,131,888 | Harris | Oct. 4, 1938 |
| 2,230,262 | Pollack | Feb. 4, 1941 |
| 2,423,321 | Hurley | July 1, 1947 |
| 2,423,322 | Hurley | July 1, 1947 |
| 2,433,456 | Jansen | Dec. 30, 1947 |
| 2,474,712 | Aparico | June 28, 1949 |
| 2,493,192 | Grey | Jan. 3, 1950 |
| 2,753,487 | Bone | July 3, 1956 |
| 2,755,700 | Ljungstrom | July 24, 1956 |